United States Patent [19]

Hirayama et al.

[11] Patent Number: 4,561,056

[45] Date of Patent: Dec. 24, 1985

[54] ELECTRONIC CONTROL APPARATUS FOR INTERNAL COMBUSTION ENGINE

[75] Inventors: Takeshi Hirayama, Mito; Matsuo Amano; Takao Sasayama, both of Hitachi; Shirou Baba, Tokorozawa, all of Japan

[73] Assignee: Hitachi, Ltd., Tokyo, Japan

[21] Appl. No.: 434,387

[22] Filed: Oct. 14, 1982

[30] Foreign Application Priority Data

Oct. 16, 1981 [JP] Japan .................. 56-164125

[51] Int. Cl.⁴ .................. F02P 5/08; F02M 7/16; F02B 3/10; G05B 15/02
[52] U.S. Cl. .................. 364/431.05; 123/417; 123/480; 364/431.11
[58] Field of Search .............. 364/431.04, 431.05, 364/431.06, 431.12, 565; 123/480, 489, 417

[56] References Cited

U.S. PATENT DOCUMENTS

| | | | |
|---|---|---|---|
| 4,204,256 | 5/1980 | Klötzner | 364/431.12 |
| 4,274,142 | 6/1981 | Furuhashi et al. | 364/565 |
| 4,276,601 | 6/1981 | Tokuda et al. | 364/431.12 |
| 4,310,889 | 1/1982 | Imai et al. | 364/431.04 |
| 4,312,038 | 1/1982 | Imai et al. | 364/431.12 |
| 4,367,530 | 1/1983 | Morinaga et al. | 364/431.06 |
| 4,373,187 | 2/1983 | Ishii et al. | 364/431.06 |
| 4,383,515 | 5/1983 | Higashiyama et al. | 123/489 |

Primary Examiner—Felix D. Gruber
Attorney, Agent, or Firm—Antonelli, Terry & Wands

[57] ABSTRACT

In an electronic control apparatus for an internal combustion engine, the contents of a selected reference register are compared with the count contents of a timer so that when equality is found therebetween, an interrupt signal is applied to a central processing unit, which then computes when and how a control condition is to be changed with respect to one of a plurality of controlled systems and the contents of the reference register are updated accordingly. In addition, a plurality of actuators for controlling the operation of the engine are selectively controlled in accordance with control signals generated from the central processing unit on the basis of the receipt of the interrupt signals.

10 Claims, 22 Drawing Figures

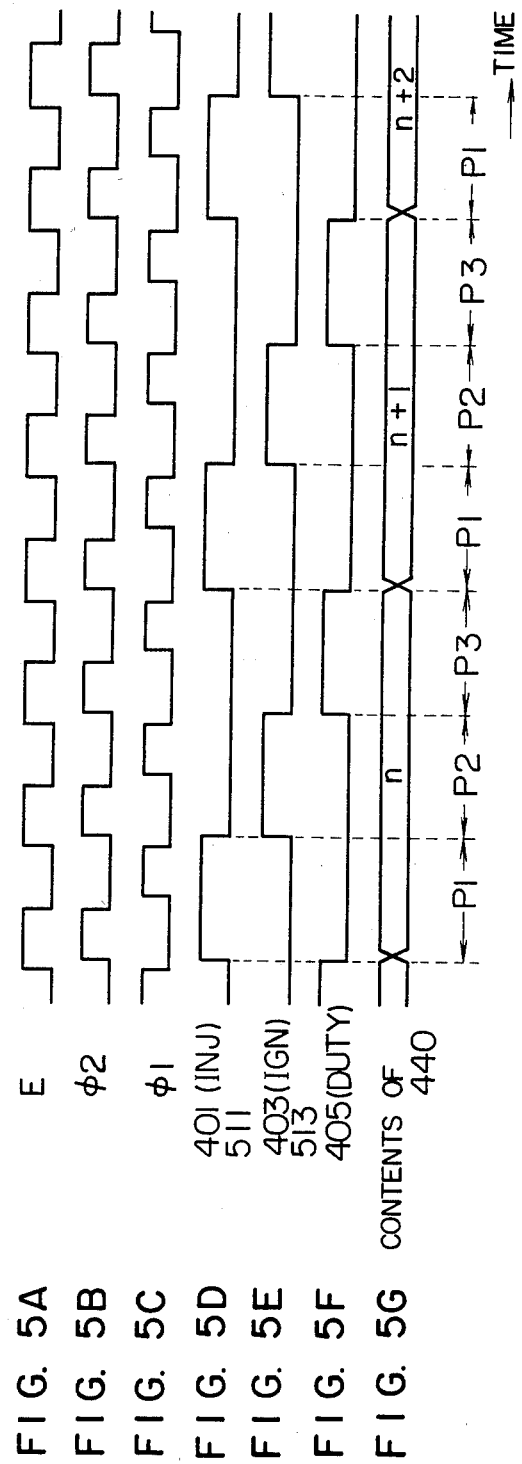

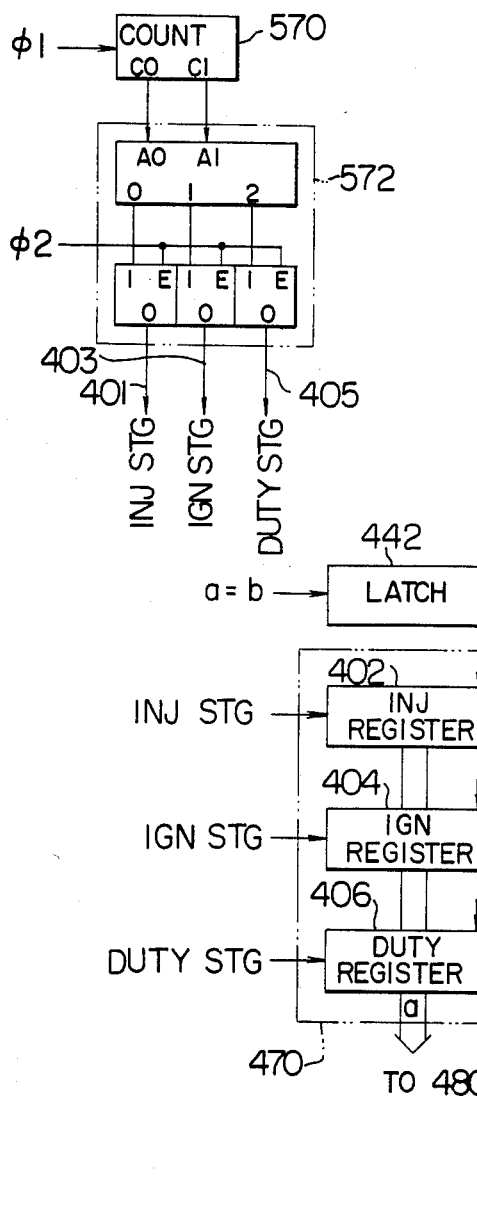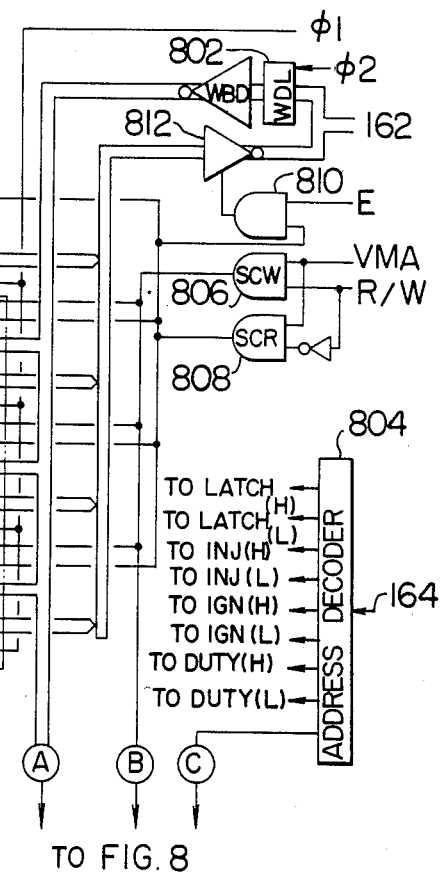

ELECTRONIC CONTROL APPARATUS FOR INTERNAL COMBUSTION ENGINE

BACKGROUND OF THE INVENTION

The present invention relates to electric control apparatus for internal combustion engines and more particularly to a method and apparatus for electronically controlling an internal combustion engine by means of a microcomputer (MPU).

With the ever increasing demand for automobiles as popular means of transportation, various social problems have arisen. Included among these problems are mainly the polution of the atmosphere and the consumption of petroleum energy.

In spite of advances in engine control, efforts continue to be made for the control of exhaust gas. However, these attempts have resulted in a deterioration of the overall efficiency of an internal combustion engine (hereinafter referred to as an engine). From the standpoint of preventing the deterioration of the engine operating efficiency and improving the control of exhaust emissions, attempts have been made to use electronic controls and improve the control accuracy. For instance, electronically controlled fuel injection systems and ignition timing control apparatus have been proposed and various types of ignition timing control apparatus using a microcomputer have been proposed.

It has been the tendency of the previously known systems to replace the mechanical controls with corresponding electrical controls. As a result, electronic control systems have been proposed which are each associated with an individual one of the controlled systems.

To effect the control of exhaust emissions and ensure efficient operation of an engine, the engine must be controlled as a whole. By simply providing controlled systems each associated with a separate engine control as mentioned previously, there has been an insufficient organic interaction between the controlled systems and it has been difficult to provide a sophisticated control. There has been another disadvantage of requiring excessively complicated circuitry. In addition, a plurality of circuits have been required for detecting the irregularly introduced outputs of sensors including an angular position sensor, etc.

In U.S. Pat. No. 4,276,601 an engine control method and apparatus are disclosed which effect such complicated engine controls electronically and collectively in accordance with digital computational operations and its input/output circuit includes a large number of register groups into which are set the data processed by an MPU, such as, the values corresponding to ignition timings and fuel injection quantities, and this overall control requires large-scale circuitry thus making it difficult to integrate the required MPU and input/output circuit on the same semiconductor. Thus, there has been the disadvantage of the productivity being inferior.

SUMMARY OF THE INVENTION

It is therefore the primary object of the present invention to provide a method and apparatus for electronically controlling an internal combustion engine to ensure improved productivity.

A first feature of the present invention is that, in response to an interrupt signal (IRQ) generated upon reaching a count preset into at least one reference register representing an elapsed time, a microcomputer performs the necessary computational operations to determine when and how a control (e.g., a control for turning an actuator on or off) is to be effected with respect to which the controlled system (e.g., an ignition control) and an actuator, for example, is controlled in accordance with the thus produced control signals.

A second feature of the invention is that a plurality of controlled systems required for the overall control of an engine are divided into those requiring relatively short computational cycle times and others requiring relatively long computational cycle times, whereby the former are processed and controlled by special processing circuits provided in an input/output circuit section and the latter are processed and controlled in accordance with a program of an MPU, thereby integrating the MPU and the input/output circuits on the same semiconductor and improving the productivity.

BRIEF DESCRIPTION OF THE DRAWINGS

The present invention will become readily apparent from the following description taken in conjunction with the accompanying drawings, in which:

FIGS. 5A to 5G show a plurality of waveforms illustrating the stage processing operations of the circuitry shown in FIG. 4;

FIG. 6 is a block diagram showing the details of the stage counter in the circuitry of FIG. 4;

FIG. 7 is a block diagram showing a specific embodiment of the reference register group shown in FIG. 4;

DETAILED DESCRIPTION OF A PREFERRED EMBODIMENT

An embodiment of the invention will now be described.

Figure 1:
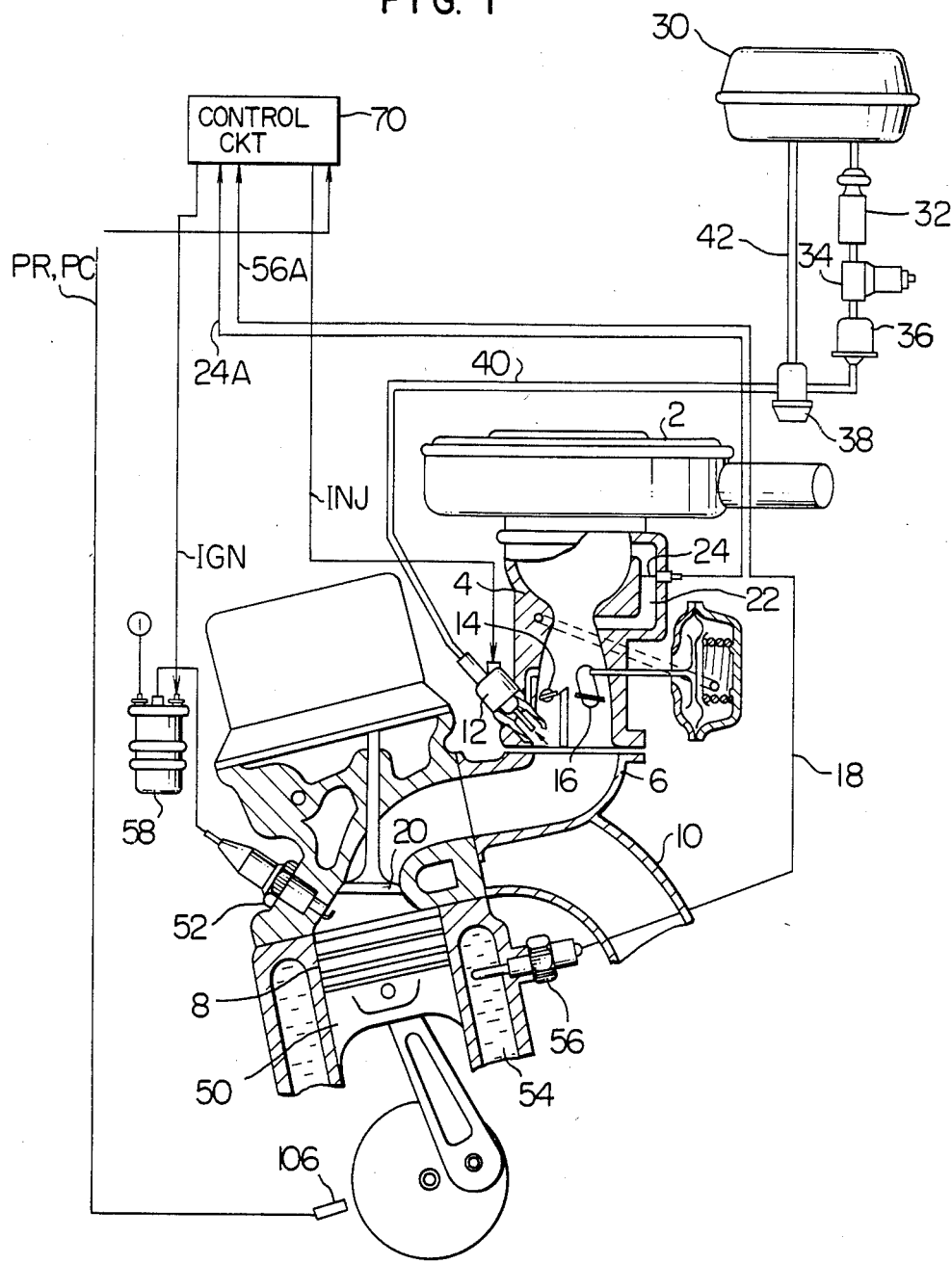
FIG. 1 shows the arrangement of a control apparatus for all of the systems of an engine.

FIG. 1 shows a control apparatus for all of the systems of an engine. In the Figure, the air drawn in is supplied to a cylinder 8 via an air cleaner 2, a throttle chamber 4 and an intake pipe 6. The combustion gas from the cylinder 8 is discharged to the atmosphere through an exhaust pipe 10.

Positioned in the throttle chamber 4 is an injector 12 for injecting fuel and the fuel injected from the injector 12 is atomized within the air passage of the throttle chamber 4 and mixed with the intake air producing a mixture. The mixture is then passed through the intake pipe 6 and supplied into the combustion chamber of the cylinder 8 when an intake valve 20 is opened.

Throttle valves 14 and 16 are positioned in the vicinity of the outlet of the injector 12. The throttle valve 14 is mechanically linked to the accelerator pedal and is operated by the driver. The other throttle valve 16 is arranged so as to be operated by a diaphragm 18 so that the valve 16 is closed fully when the rate of air flow is in a smaller range and the negative pressure to the diaphragm 18 is increased as the amount of air flow increases thereby causing the valve 16 to start to open and prevent the intake resistance from increasing.

A bypass air passage 22 is provided upstream of the throttle valves 14 and 16 in the throttle chamber 4, and disposed in the bypass air passage 22 is an electric heating element 24 forming an air-flow sensor thereby generating a periodic electric signal which varies in accordance with the air flow velocity determined by the relation between the air flow rate and the amount of heat transmission of the heating element 24. Since the heating element 24 is positioned in the bypass air passage 22, it is protected from high temperature gases produced by backfiring in the cylinder 8 and it is also protected from being contaminated by dust or the like in the intake air. The outlet of the bypass air passage 22 is opened at a point near the narrowest portion of the venturi and its inlet is opened at a point upstream of the venturi.

The fuel to be supplied to the injector 12 is first supplied to a fuel pressure regulator 38 from a fuel tank 30 through a fuel pump 32, a fuel damper 34 and a filter 36. As a result, the pressurized fuel is supplied from the fuel pressure regulator 38 to the injector 12 through a pipe 40 and the fuel pressure regulator 38 returns the fuel to the fuel tank 30 through a return pipe 42 so as to maintain constant the difference between the pressure in the intake pipe 6 into which the fuel is injected from the injector 12 and the fuel pressure to the injector 12.

The mixture introduced from the inlet valve 20 is compressed by a piston 50 and ignited by a spark from a spark plug 52 and the resulting combustion is converted to a kinetic energy. The cylinder 8 is cooled by cooling water 54 and the temperature of the cooling water is measured by a water temperature sensor 56. The measured value is used to represent the engine temperature. A high voltage is supplied to the spark plug 52 from an ignition coil 58 in accordance with the ignition timing.

On the other hand, a crank angle sensor 106 is provided for the engine crankshaft so as to generate a reference angular signal and an angle signal at intervals of a reference crank angle and a given angle (e.g., 0.5 degrees of crank angle), respectively, in response to the engine rotation.

The outputs PR and PC from the crank angle sensor 106, the output 56A from the water temperature sensor 56 and the electric signal 24A from the heating element 24 are applied to a control circuit 70 comprising a microcomputer, etc., and are processed by the control circuit 70 thereby operating the injectors 12 and the ignition coil 58 in accordance with the outputs from the control circuit 70.

The above-described operation of the engine will now be explained with reference to FIG. 2 in which at A is shown the injection timing of fuel from the injectors of a four-cylinder engine. The abscissa represents the rotational angle of the engine crankshaft and the suction strokes of the respective cylinders are shown by the hatching. As will be seen from the Figure, the intake stroke is produced at intervals of 180° of crank angle, that is, the intake stroke occurs during 0° to 180° for the No. 1 cylinder, during 180° to 360° for the No. 3 cylinder, during 360° to 540° for the No. 4 cylinder and during 540° to 720° for the No. 2 cylinder.

Figure 2:
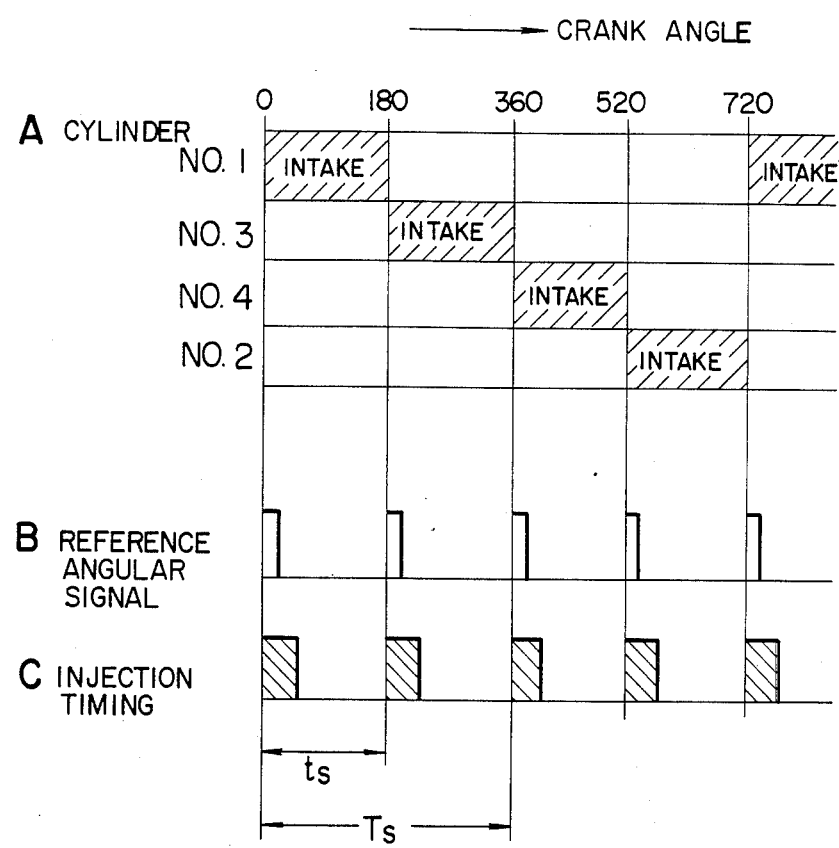
FIG. 2 is a time chart for explaining the operation of the engine.

As shown at B in FIG. 2, a reference angular signal is generated for each 180° of crank angle and the injectors 12 are opened in response to the signal. The valve opening time of the injectors 12 is determined on the basis of the result of the operations performed by the control circuit 70 in accordance with the measured data. The valve opening time of the injectors 12 or the fuel injection time is shown at C in FIG. 2.

Figure 3:
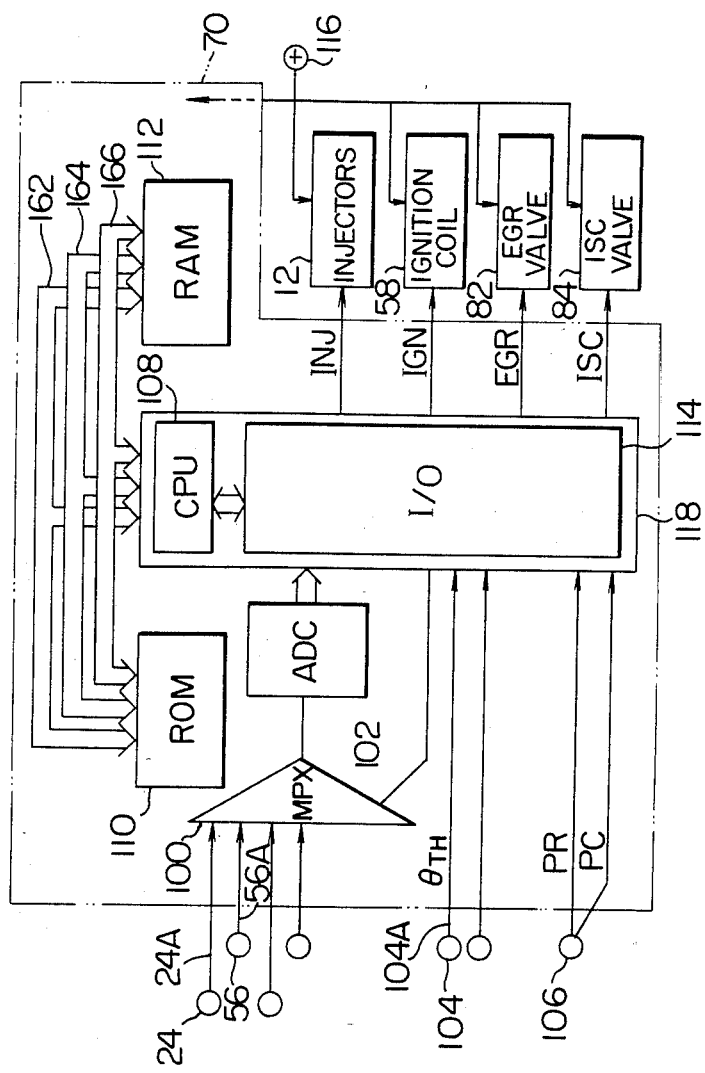
FIG. 3 is a block diagram showing the detailed construction of an engine control circuit.

Next, the control circuit 70 will be described with reference to FIG. 3. FIG. 3 shows the individual blocks of the control circuit 70 and in the Figure the input signals are roughly divided into three classes. More specifically, the first class of signals comprise analog input signals applied from the output 24A of the heating element 24 for detecting the amount of air flow, the output 56A of the sensor 56 for sensing the engine cooling water temperature and other analog sensors. These analog inputs are applied to a multiplexer 100 (hereinafter referred to as an MPX) so that the sensor outputs are selected in a time-shared manner and sent to an analog-to-digital converter 102 (hereinafter referred to as an ADC) which converts the analog inputs to digital values. The second class of signals include data inputted as on-state and off-state signals, such as, a signal $\theta_{TH}$ indicative of the fully-closed position of the throttle valve which is a signal 104A transmitted from a switch 104 operable in association with the throttle valve. This signal can be handled as a 1-bit digital signal. Other signals are derived from other digital sensors.

Then, the input signals which may be considered as the third class of signals include for example the reference angular signal (hereinafter referred to as PR) and the angle signal (hereinafter referred to as PC) and these signals are applied from the crank angle sensor 106. The signal PR is generated at intervals of 180° of crank angle in the case of a four-cylinder engine, 120° of crank angle in the case of a six-cylinder engine and 90° of crank angle in the case of an eight-cylinder engine. The signal PC is generated for example at intervals of 0.5° of crank angle.

A microprocessor unit MPU 118 comprises a central processing unit 108 and an input/output interface circuit 114, and the CPU 108 is a central processing unit for performing digital computational operations. An ROM 110 is a memory for storing control programs and fixed data and an RAM 112 is a read/write memory. The input/output interface circuit 114 (hereinafter referred to as an input/output circuit 114) receives its input signals from the ADC 102 and the sensors 104 and 106 and supplies the signals to the CPU 108. Also, the signals from the CPU 108 are sent as signals INJ, IGN, EGR and ISC to the injectors 12, the ignition coil 58, an exhaust gas recycle EGR valve 82 and an idle speed control ISC valve 84, respectively. While a voltage is applied from a power supply terminal 116 to the individual circuits and elements forming the control circuit 70, this is not shown in the Figure. Also, each of the injectors 12, the ignition coil 58, the EGR valve 82 and the ISC valve 84 includes an electromagnetic coil for operating the valve and a primary coil for storing electromagnetic energy and each of these coils has its one end connected to the power supply terminal 116 and its other end connected to the input/output circuit 114 thereby controlling the current flowing to the injectors 12 and the ignition coil 58. In FIG. 3, numeral 162 designates a data bus, 164 an address bus and 166 a control bus.

Figure 4:
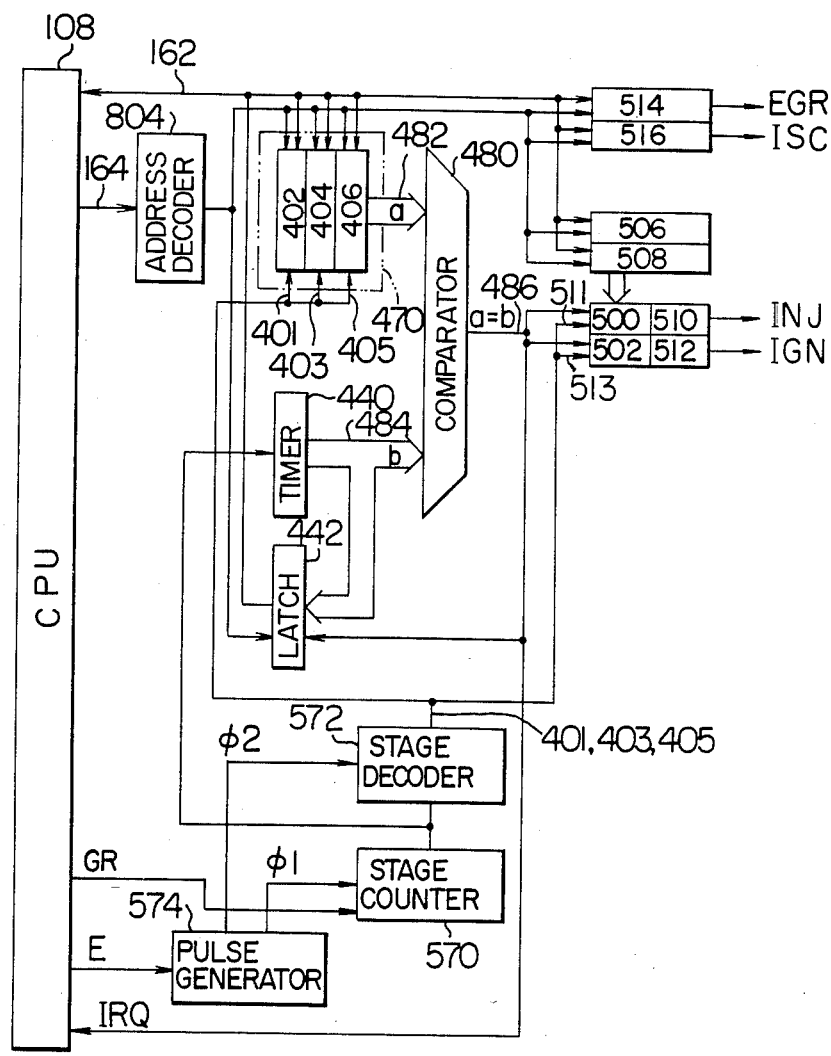
FIG. 4 is a block diagram showing the details of the microprocessor unit MPU shown in FIG. 3.

FIG. 4 shows a detailed circuit construction of the MPU 118 shown in FIG. 3.

In the Figure, a register group 470 indicated by a broken line is a reference register group for storing the data processed by the CPU 108, e.g., the timing data or data indicative of predetermined constant values. This data is transmitted from the CPU 108 through the internal data bus 162. The selection of any register for storage purposes is effected through the address bus 164 and the data from the CPU 108 is applied and stored in the selected register. The register group 470 comprises registers 402, 404 and 406.

A timer 440 counts the pulse signals applied from a stage counter 570 which divides the frequency of the clock signals from the pulse generator 574.

A comparator 480 receives the reference data from the selected register in the register group 470 and the count representing time data from the timer 440 through input terminals 482 and 484, respectively, and performs the operation of comparison on the input data. The comparison result is generated from an output terminal 486. The output terminal 486 is connected to holding registers 500 and 502 which serve as output holding registers and their respective output registers 510 and 512 respectively hold the states corresponding to the contents of control registers 506 and 508 for outputting purposes.

The operation of the register group 470, the timer 440 and the comparator 480 and the output setting operation to the output registers 510 and 512 are performed within a given time period. The various processes are executed in a time-shared manner in accordance with a stage sequence commanded by a stage decoder 572. Corresponding registers of the register group 470 and the output registers 510 and 512 are selected for each of the stages. The comparator 480 is used in common to all the stages.

FIGS. 5A to 5G are diagrams showing the timing of the stage decoder 572 of FIG. 4. The clock signals E from the CPU 108 are supplied to the "pulse generator 574, which generates the clock signals $\phi_1$ and $\phi_2$. The signals E $\phi_1$ and $\phi_2$ are shown in FIGS. 5A, 5B and 5C, respectively. The stage counter 570 counts the clock signals $\phi_1$ from the pulse generator 574 and supplies the count result to the stage decoder 572 and the timer 440. The stage decoder 572 is constructed as shown in FIG. 6 and it produces three signals which are not overlapping from the two signals $\phi_1$ and $\phi_2$. The three signals are respectively shown in FIGS. 5D, 5E and 5F. The timer 440 increases its contents by 1 in response to each repetition of the cycle of the three signals of FIGS. 5D, 5E and 5F as shown in FIG. 5G.

Initially, a general reset signal GR is applied to the reset terminal R of the stage counter 570 of FIG. 6 and its counter outputs $C_0$ and $C_1$ are both set to zero. This general reset signal is applied from the CPU 108 when the control circuit is set in operation. In this condition, when a clock signal $\phi_2$ is applied, a stage signal IGN STG is generated in response to the leading edge of the clock signal $\phi_2$. An IGN STA processing is performed in accordance with the stage signal 403. Then, in response to a clock signal $\phi_1$ the stage counter 570 increases its count by 1 and the next stage signal DUTY STG is generated in response to the next clock signal $\phi_2$. A DUTY processing is performed in accordance with the stage signal DUTY STG. When the stage counter 570 continues to count up in synchronism with the clock signals $\phi_1$ in this way, the corresponding stage signals STG are generated in synchronism with the clock signals $\phi_2$ and the corresponding processings are performed in accordance with these signals.

When the outputs $C_0$ and $C_1$ of the stage counter 570 both become 1, a stage signal INJ STG is generated and an INJ processing is performed thus completing all the processings.

FIG. 7 shows in more detail the register group 470 shown in FIG. 4.

The application of data to the register group 470 will now be described. The data from the CPU 108 is applied to a latch circuit 802 through the data bus 162. Simultaneously with this input of data, a read/write signal R/W and an access signal VMA are applied from the CPU 108 to AND gates 806 and 808 via the control bus 166. Also, one of the registers in the input/output circuit 114 is selected in response to the address signal applied via the address bus 164. As is well known in the art, this method changes the data from the address bus 164 to the signals corresponding to the respective registers through a decoder and it is performed by the address decoder 804 of FIG. 4. The outputs from the decoder 804 are applied to the registers 402 to 406 and the latch circuit 442 and the writing for these input signals is not shown in the Figure. Then, in response to the read/write signal R/W, the access signal VMA and an address bit which is indicative of the input/output circuit 114 and not shown, the AND gate 806 generates a select-chip write signal SCW and the AND gate 808 generates a select-chip read signal SCR.

To write the data from the CPU 108 in a selected one of the registers, a select-chip write signal SCW is generated and the signal SCW is applied to the input terminal of the registers 402 to 406 and the latch circuit 442, respectively. In this case, no select-chip read signal SCR is generated so that the AND condition of an AND gate 810 is not established and a three-state buffer 812 is closed.

In this condition, the data applied through the data bus 162 is held in the latch circuit WDL 802 in response to a timing signal $\phi_2$. The data held in the latch circuit 802 is applied to the respective registers of the reference register group 470 through a write driver WBD so that the data is applied and stored in one of the registers selected by the address decoder 804 in response to a timing signal $\phi_1$. Each of the registers 402, 404 and 406 of the reference register group 470 is a 10-bit register and each of the CPU 108 and the data bus 162 is of the 8-bit type. Thus, different addresses are assigned to the lower eight bits and the higher two bits, respectively, of each register. As a result, the data is applied in two parts to each of the 10-bit registers.

On the other hand, the reading of data from each of the registers in the reference register group 470 is accomplished by the operation just reverse to that mentioned previously. In other words, the control signal from the control bus 166 opens the select-chip gate SCR 808 so that the buffer 812 is opened by a timing signal E through the AND gate 810 and a read operation is performed in this condition. More specifically, since a given one of the registers has been selected by the address signal from the address bus 164, the data stored in the given register is delivered through the three-state buffer 812 onto the data bus 162 and then transmitted to the CPU 108.

The operation of selecting the reference registers in accordance with the stage signals will now be described. Corresponding one of the stage signals is applied to each of the registers in the register group 470. Each of the stage signals selects one of the registers corresponding to one of the stages.

Figure 8:
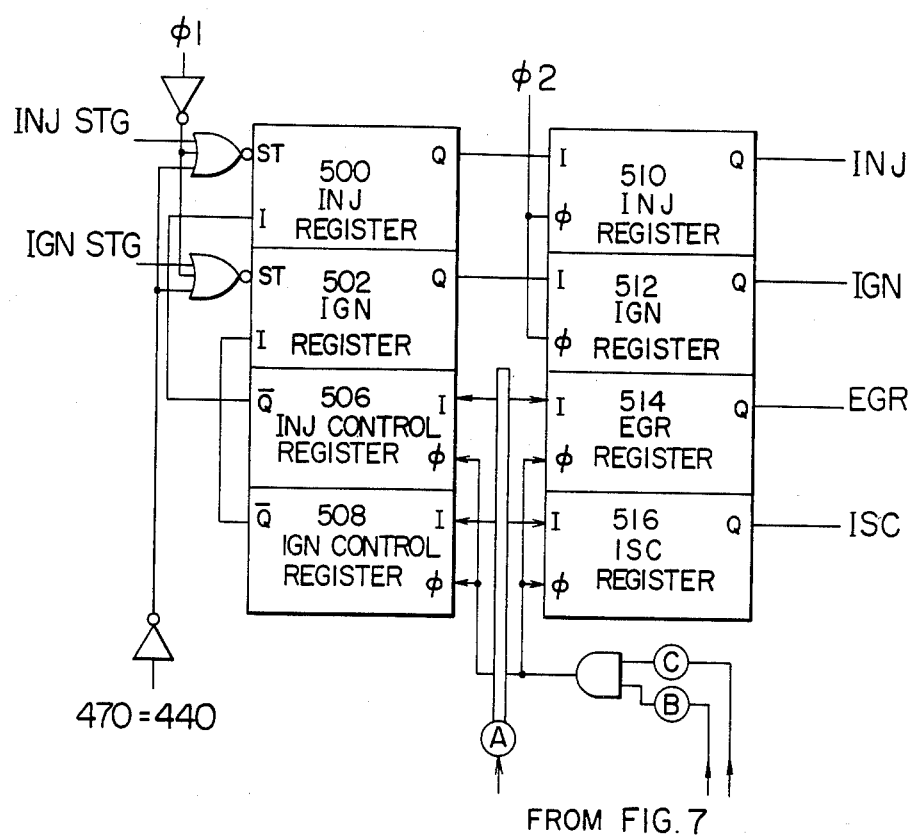
FIG. 8 is a circuit diagram showing a specific embodiment of first and second comparison output register groups.

FIG. 8 shows a detailed circuit diagram of the first and second output register groups of FIG. 4. In the Figure, the registers 500, 502, 506 and 508 of the first output register group must respectively be selected in synchronism with the registers 402, 404 and 406 of the reference register group 470 and therefore the timing clock signals $\phi_1$ for setting the first output register group and the corresponding stage signals are applied to provide the required synchronization. Thus, at each stage, the comparison result corresponding to the stage is first latched in the corresponding register of the first output register group in response to the timing clock signal $\phi_1$. On the other hand, the clock signals $\phi_2$ are applied as timing signals for setting the second output register group and thus the comparison result is set in the second output register group by the timing clock signal $\phi_2$ following the timing clock signal $\phi_1$. In this way, the corresponding outputs are generated from the second output register group.

To detect the pulse train signals applied to the input-/output circuit 114 from the sensors, it is necessary to synchronize the pulse train signals and the operation of the input/output circuit 114. The reason is that if the period and pulse duration of the pulse train signal varies due for example to variation in the engine rotational speed or the vehicle speed and moreover they vary considerably and if the signal is detected as such, the pulse train signal corresponds to a plurality of periods of the stage for detecting it or becomes much shorter than the period of the stage for detecting it and the pulse train signal disappears before the generation of a stage signal thus making it difficult to count the pulse train accurately.

Figure 9:
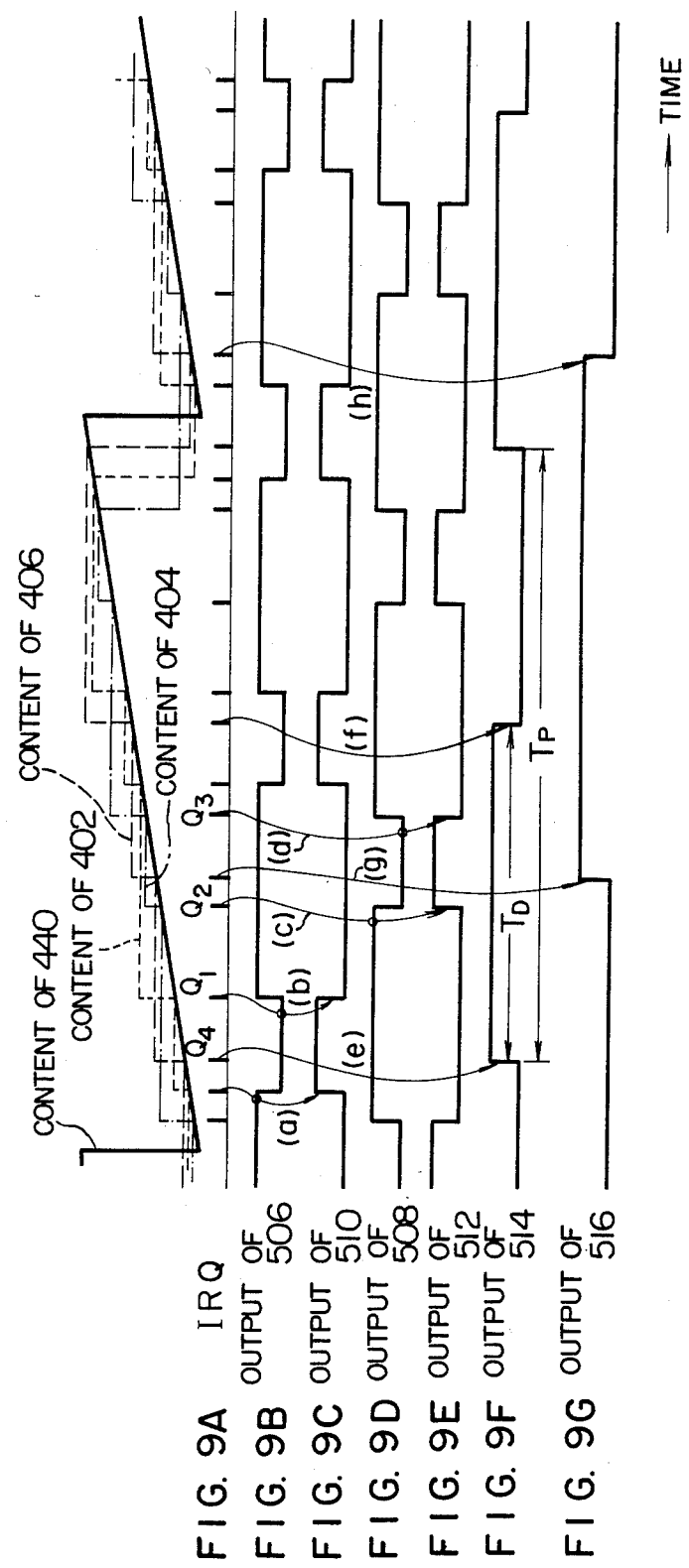
FIGS. 9A to 9G show a plurality of waveforms illustrating the operation of the circuitry shown in FIG. 4.

Next, the operation of the circuitry of FIG. 4 will be described with reference to FIGS. 9 and 10.

Initially, when the outputs of the stage decoder 572 go respectively to the high level in FIG. 5D and the low level in FIGS. 5E and 5F, i.e., during the interval P1 in FIG. 5G, the register 402 is selected from the register group 470 by the select signal 401 from the stage decoder 572 and thus an input a is applied to the comparator 480. The input a is compared with the signal b from the timer 440 so that the interrupt signal IRQ of FIG. 9A is generated at an output terminal 486 of the comparator 480 only when the signals a and b become equal or a=b. In this case, if the contents of the control register 506 are 1, the output register 510 goes to the high level in response to a select signal 511. This represents the case of the arrow (a) shown in FIG. 9. The output signal IRQ from the comparator 480 also serves as an interrupt signal to the CPU 108 so that the CPU 108 updates the contents of the register 402 and the output control register 506 in response to the receipt of the IRQ signal.

Figure 10:
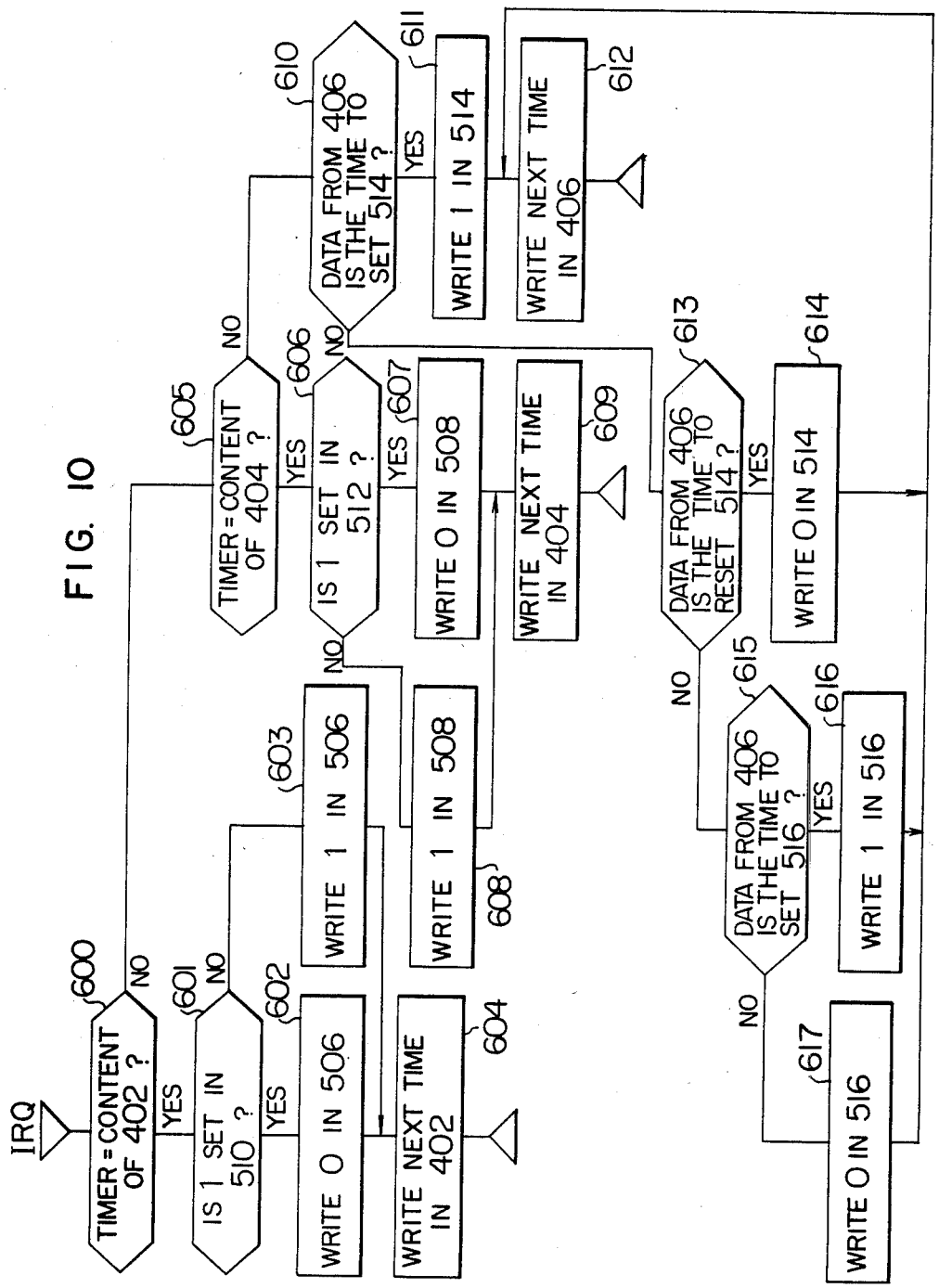
FIG. 10 is a flow chart showing the operation of the central processing unit CPU shown in FIG. 4.

In other words, when the interrupt signal IRQ is generated, as shown in FIG. 10, a step 600 determines whether the output value of the timer 440 and the output value of the register 402 are equal to each other. Namely, it is determined whether the designated time indicated by the data stored in the register 402 is reached. If the equality is found, a step 601 determines whether 1 is already set in the output register 510. If the step 601 determines that 1 is already set in the output register 510, a step 602 writes 0 in the output register 506. This is done so that the contents of the output register 510 are set to 0 as shown at (b) in FIG. 9 when the next IRQ signal $Q_1$ is generated. On the contrary, if the contents of the output control register 506 are 0, the output register 510 goes to the low level. Then, a step 604 writes in the register 402 a time at which the signal Q1 is to be generated. In this case, the CPU 108 updates the contents of the register 402 and the output control register 506 upon receipt of the signal IRQ. In other words, if the step 601 of FIG. 10 determines that 1 is not set in the output register 510, a step 603 writes 1 in the output control register 506 and the step 604 writes the next time in the reference register 402. As a result, when the time written in the reference register 402 is reached, the output of the output register 510 goes to 1. In other words, the injectors 12 are opened.

Then, when an interval P2 is reached so that the outputs of the stage decoder 572 go to the low level in FIGS. 5D and 5F and the high level in FIG. 5E, the register 404 is selected by a select signal 403. As a result, in accordance with the similar operation previously described in connection with the register 402, the output register 512 goes to the high level or the low level in dependence on whether the contents of the output control register 508 are 1 or 0 at the timing corresponding to a select signal 513. In other words, the ignition timing is controlled. This is shown by arrows (c) and (d) in FIG. 9. The CPU 108 updates the register 404 and the output control register 508 in accordance with the IRQ signals $Q_2$ and $Q_3$ generated in this case. In other words, in FIG. 10, when the step 600 determines that the count contents of the timer 440 are not equal to the contents of the output control register 402, a step 605 determines whether the timer output value is equal to the output value of the output register 404, that is, whether the time set in the register 404 is reached. If the equality is determined, a step 606 determines whether 1 is already set in the output register 512. If the step 606 determines that 1 is already set, then a step 607 writes 0 in the output register 508. On the contrary, if the step 606 determines that 1 is not set as yet, 1 is written into the output register 508. When the writing of the output register 508 is completed, the next time is written in the output register 404 by a step 609 in the similar manner as mentioned previously.

Then, when the outputs of the stage decoder 572 go to the low level in FIGS. 5D and 5E and the high level in FIG. 5F as shown in the interval P3 of FIG. 5G, the register 406 is selected by a select signal 405. In this case, even if the comparator 480 generates an output, the contents of the output registers 514 and 516 are not changed immediately and only an IRQ signal is applied to the CPU 108. As a result, the CPU 108 operates as shown by steps 610 to 617 in FIG. 10. In other words, if the step 605 determines that the output value of the timer 440 is not equal to the output value of the reference register 404, the step 610 determines whether the data from the reference register 406 is indicative of the time at which the output register 514 is to be set. If the step 610 determines that the data indicates the time of setting the output register 514, the step 611 writes 1 in the output register 514. If the step 611 writes 1, then the step 612 writes the next time in the reference register 406. In this way, when the time set in the register 406 is reached, the register 514 generates an EGR output as shown at (e) of FIG. 9 at the time of an IRQ signal $Q_4$.

On the other hand, if the step 610 determines that the data from the reference register 406 is not indicative of the time at which the output register 514 is to be set, the step 613 determines whether the data from the reference register 406 is indicative of the time at which the output register 514 is to be reset. If it is determined that the data is indicative of the reset time, the step 614 writes 0 in the output register 514 and transfers to the step 612.

On the contrary, if the step 613 determines that the data is not indicative of the reset time, the step 615 determines whether the data contents of the reference register 406 are indicative of the time to set the output register 516. If the determination is affirmative, the step 616 writes 1 in the output register 516. On the contrary, if the step 615 determines that the data from the register 406 is not indicative of the time to set the output register 516, the step 617 writes 0 in the output register 516. In either of the cases, a transfer is made to the step 612.

In accordance with the present embodiment, the single reference register 406 is used alternately with respect to two control outputs EGR and ISC to operate in the following manner. Firstly, at the time indicated by the arrow (e) in FIG. 9, the contents of the timer 440 or the current time is transferred and held in the timer latch 442 in response to an IRQ signal $Q_4$. When the IRQ signal is received, the CPU 108 reads in the contents of the timer latch 442 through the internal data bus 162. Then, in accordance with this time, it is determined that the EGR output is to go to the high level and then 1 is written in the output register 514. Simultaneously, the data indicating the time of the next operation in the series of operations relating to the output registers 514 and 516, shown by the arrow (g) in FIG. 9, or the time to cause the register 516 to go to the high level is determined and written in the register 406.

As described hereinabove, the CPU 108 participates in all of the controls of the registers 514 and 516 and effects the controls by the single reference register 406. As a result, the embodiment is most suited for the purpose of controlling the opening of the valves in accordance with a ratio $T_D/T_P$ between a pulse width $T_D$ and a period $T_P$ as shown in FIG. 9 and thus it is only necessary to use the single register 406 of the register group 470 associated with the output registers 514 and 516. Thus there is the effect of reducing the size of the output circuitry.

Further, since all the operations are performed in accordance with the times indicated by the timer 440, the timer connected to the input terminal 484 of the comparator 480 does not require a large number of registers as in the case of the conventional control apparatus of this type and there is the effect of further reducing the size of the circuitry.

Still further, in accordance with the present embodiment the single timer is used and also the single common register for holding time data is used to effect the controls of relatively long periods. Thus, there is the effect of reducing the size of the input/output circuit section and thereby easily integrating it with the CPU section on the same semiconductor.

While, in the embodiment described above, the timer 440 comprises a free-running counter of the type which overflows when a given time expires, the present invention is not intended to be limited thereto and it is possible to use a counter of the type which is reset to update its contents.

Further, in accordance with the embodiment, the latch circuit 442 stores as a "condition" the contents of the timer 440 existing at the time of generation of an IRQ signal from the comparator 480 and the CPU 108 reads in the timer contents or the condition thereby determining "which register is to be operated next at what time and in what manner". However, the "condition" is not limited only to the contents of the timer 440. For instance, the "condition" may comprise the contents (indicative of a time) of that register which is in operation when an IRQ signal is generated or it may be that stage signal in use when an IRQ signal is generated. In accordance with any one of these "conditions", the CPU 108 can determine "which register is to be operated next at what time and in what manner (e.g., whether the register is to be turned on or off)".

Still further, in accordance with the embodiment, a plurality of output registers can be controlled by a single reference register so as to control a plurality of controlled systems, such as, EGR and ISC which may be controlled in a relatively slow manner. However, in the case of controlled systems, such as, INJ and IGN which must be controlled at high speeds, it is impossible to wait for the time required for the computation by a computer (if allowed to wait, accurate controls cannot be ensured) and thus it is necessary to use a separate reference register and a separate control register for each of the controlled systems.

If a computer of a high computing speed is used, a single reference register may be used in common by a plurality of controlled systems requiring high speed control.

We claim:

1. In a control apparatus for an internal combustion engine comprising a plurality of sensors for producing signals representative of operating conditions of said engine, a plurality of actuators for controlling the operation of said engine, and signal processing means responsive to the signals from said sensors to perform processing operations and produce signals for controlling said actuators, the improvement wherein said signal processing means comprises:
   (a) at least one reference register for storing data representing a given time for controlling the operation of said engine;
   (b) counting means for measuring an elapsed time;
   (c) comparing means for comparing the contents of said reference register and said counting means and for producing an interrupt signal when equality between said contents is detected;
   (d) means for storing a condition existing when said interrupt signal is generated;
   (e) central processing means for reading said existing condition from said storing means each time said interrupt signal is generated and for computing, in accordance with said existing condition, when and how a control condition is to be changed with respect to a particular one of a plurality of controlled systems selected on the basis of said existing condition to generate a control signal; and
   output register means for storing said control signal and for applying the same to a corresponding one of said plurality of actuators when a set given time is reached.

2. An apparatus according to claim 1, wherein said existing condition is the contents of said counting means existing when said interrupt signal is produced.

3. An apparatus according to claim 1, wherein said existing condition is the contents of said reference register existing when said interrupt signal is produced.

4. An apparatus according to claim 1, wherein said existing condition is a stage signal existing when said interrupt signal is produced.

5. An apparatus according to claim 1, wherein said reference register is provided in common for each of a plurality of said controlled systems, wherein said output register means comprises a plurality of output registers each being provided for a respective one of said plurality of controlled systems, and further including control register means for storing said data generated from said central processing means which is indicative of how to change said control condition and for applying said data to one of said output registers of said output register means in accordance with said existing condition.

6. In an electronic control apparatus for an internal combustion engine comprising a plurality of sensors for producing signals representing operating conditions of said engine, a plurality of actuators for controlling the operation of said engine, and signal processing means responsive to the signals from said sensors to perform processing operations and produce signals for controlling said actuators, the improvement wherein said signal processing means comprises:
   (a) means including at least one reference register for storing data representing a given time and for updating the stored contents of said reference register so as to control a plurality of controlled systems or operations of said engine;
   (b) counting means for measuring an elapsed time;
   (c) comparing means for comparing the contents of said reference register and said counting means and for producing an interrupt signal when equality is found therebetween;
   (d) means for storing a condition existing when said interrupt signal is produced;
   (e) central processing means for reading said existing condition each time said interrupt signal is produced and for computing, in accordance with said existing condition, when and how a control condition is to be changed with respect to a particular one of said plurality of controlled systems selected on the basis of said existing condition thereby producing a plurality of control signals, one of said control signals relating to when control is to be effected and being stored in said reference register; and
   (f) output register means whereby when said given time stored in said reference register and relating to when control is to be effected is reached, one of said control signals relating to changing said control condition is applied to one of said plurality of actuators corresponding to one of said controlled systems selected in accordance with the result of the processing operations of said central processing means.

7. An apparatus according to claim 6, wherein said existing condition is the contents of said counting means existing when said interrupt signal is produced.

8. An apparatus according to claim 6, wherein said existing condition is the contents of said reference register existing when said interrupt signal is produced.

9. An apparatus according to claim 6, wherein said existing condition is a stage signal existing when said interrupt signal is produced.

10. An apparatus according to claim 6, wherein said reference register is provided in common for each of a plurality of said controlled systems, wherein said output register means comprises a plurality of output registers each being provided for a respective one of said plurality of controlled systems, and further including control register means for storing said data generated from said central processing means which is indicative of how to change said control condition and for applying said data to one of said control registers of said output register means in accordance with said existing condition.

* * * * *